US012634161B2

(12) United States Patent
Lin et al.

(10) Patent No.: US 12,634,161 B2
(45) Date of Patent: May 19, 2026

(54) METHOD FOR AUTOMATICALLY ACTIVATING VIDEO CONFERENCE SYSTEM AND RELATED VIDEO CONFERENCE SYSTEM

(71) Applicant: AmTRAN TECHNOLOGY CO., LTD, New Taipei City (TW)

(72) Inventors: Chien-Cheng Lin, New Taipei City (TW); Jian-Dong Chen, New Taipei City (TW)

(73) Assignee: AmTRAN TECHNOLOGY CO., LTD, New Taipei City (TW)

( * ) Notice: Subject to any disclaimer, the term of this patent is extended or adjusted under 35 U.S.C. 154(b) by 314 days.

(21) Appl. No.: 18/133,557

(22) Filed: Apr. 12, 2023

(65) Prior Publication Data
US 2024/0129147 A1 Apr. 18, 2024

(30) Foreign Application Priority Data
Oct. 12, 2022 (TW) .................................. 111138540

(51) Int. Cl.
| | |
|---|---|
| *H04L 12/18* | (2006.01) |
| *G01S 13/04* | (2006.01) |
| *G01S 13/86* | (2006.01) |
| *G01S 13/88* | (2006.01) |
| *G06F 3/16* | (2006.01) |

(52) U.S. Cl.
CPC .......... *H04L 12/1818* (2013.01); *G01S 13/04* (2013.01); *G01S 13/867* (2013.01); *G01S 13/88* (2013.01); *G06F 3/167* (2013.01)

(58) Field of Classification Search
CPC .... G01S 13/867; G01S 13/886; G01S 13/887; G01S 13/88; G01S 13/04; G08B 13/181; G08B 21/22; G06F 1/3206; G06F 3/017; H04L 12/1818
USPC .......................................................... 342/55
See application file for complete search history.

(56) References Cited

U.S. PATENT DOCUMENTS

| | | | | |
|---|---|---|---|---|
| 4,645,919 A | * | 2/1987 | McCaleb ............... | H03K 17/14 250/214 RC |
| 5,404,541 A | * | 4/1995 | Hirosawa .............. | G06F 1/3203 713/324 |
| 8,898,486 B2 | * | 11/2014 | Kang .................... | G06F 1/3203 345/212 |
| 9,600,049 B2 | * | 3/2017 | Pham ...................... | G06F 3/017 |

(Continued)

*Primary Examiner* — Michael W Justice
(74) *Attorney, Agent, or Firm* — Winston Hsu

(57) ABSTRACT

A method for automatically activating a video conference meeting device, wherein the video conference meeting device includes a power supply, a main processor and a plurality of peripheral components, and a radar detector connects to the video conference meeting device, the method comprises (a) the radar detector detecting with a radar detection coverage when the video conference device is in a standby state; (b) when the radar detector detects an object appearing in the radar detection coverage, obtain a position of the object detected in the radar detection coverage; (c) the radar detector obtaining boundary information of an effective zone and determining whether the position of the detected object is within the effective zone; (d) when the radar detector determines that the position of the detected object is within the effective zone, activating the video conference meeting device which loads an operation program.

17 Claims, 10 Drawing Sheets

(56) References Cited

U.S. PATENT DOCUMENTS

| | | | | |
|---|---|---|---|---|
| 9,797,999 | B2 * | 10/2017 | Lee | G06F 3/0482 |
| 9,993,166 | B1 * | 6/2018 | Johnson | A61B 5/4806 |
| 10,222,462 | B2 * | 3/2019 | Brown | G01S 13/42 |
| 10,393,872 | B2 * | 8/2019 | Brisimitzakis | G01S 13/931 |
| 10,488,504 | B2 * | 11/2019 | Di | G01S 7/411 |
| 10,529,206 | B2 * | 1/2020 | Sacre | G08B 13/19695 |
| 10,568,063 | B2 * | 2/2020 | Hanes | H04W 64/00 |
| 10,613,213 | B2 * | 4/2020 | Silverstein | H04L 12/2803 |
| 10,776,103 | B2 * | 9/2020 | Gordon | G06F 1/1626 |
| 10,853,053 | B1 * | 12/2020 | Gordon | G06F 3/017 |
| 11,029,942 | B1 * | 6/2021 | Gordon | G06F 3/016 |
| 11,119,186 | B2 * | 9/2021 | Roh | G01S 13/42 |
| 11,181,878 | B2 * | 11/2021 | Droitcour | G01S 13/34 |
| 11,417,184 | B2 * | 8/2022 | Sacre | G08B 13/19695 |
| 11,511,738 | B2 * | 11/2022 | Matsunaga | B60W 10/20 |
| 11,550,048 | B2 * | 1/2023 | Hayashi | G06F 3/011 |
| 11,644,556 | B2 * | 5/2023 | Ogura | G01S 13/08 342/118 |
| 11,662,450 | B2 * | 5/2023 | Steiner | G01S 13/34 702/150 |
| 11,782,124 | B2 * | 10/2023 | Van Haver | G01S 13/34 342/174 |
| 11,922,697 | B1 * | 3/2024 | Xu | G06V 10/44 |
| 12,105,191 | B2 * | 10/2024 | Axley | G01S 7/0236 |
| 12,243,403 | B2 * | 3/2025 | Yoshizawa | G06V 10/764 |
| 2008/0316221 | A1 * | 12/2008 | Aas | G09G 5/395 345/544 |
| 2010/0306558 | A1 * | 12/2010 | Kang | G06F 1/3203 713/300 |
| 2014/0097988 | A1 * | 4/2014 | Beauregard | G01S 11/04 342/461 |
| 2014/0365803 | A1 * | 12/2014 | Pham | G06F 3/017 713/324 |
| 2016/0033638 | A1 * | 2/2016 | Silc | G01S 13/867 342/55 |
| 2016/0054436 | A1 * | 2/2016 | Lee | G09G 3/20 345/87 |
| 2016/0131753 | A1 * | 5/2016 | Brown | G01S 13/931 342/128 |
| 2016/0139659 | A1 * | 5/2016 | Ho June | H04N 21/42204 345/156 |
| 2017/0099460 | A1 | 4/2017 | Nimri | |
| 2017/0160392 | A1 * | 6/2017 | Brisimitzakis | G01S 7/24 |
| 2017/0328997 | A1 * | 11/2017 | Silverstein | H04B 1/3827 |
| 2018/0018179 | A1 * | 1/2018 | Scheufler | H04L 67/306 |
| 2018/0152909 | A1 * | 5/2018 | Hanes | G01S 5/0294 |
| 2018/0203106 | A1 * | 7/2018 | Di | G01S 13/87 |
| 2018/0322751 | A1 * | 11/2018 | Sacre | G08B 13/19695 |
| 2019/0178985 | A1 * | 6/2019 | Roh | G01S 13/42 |
| 2019/0361694 | A1 * | 11/2019 | Gordon | G06F 9/452 |
| 2020/0064784 | A1 * | 2/2020 | Steiner | G06V 10/25 |
| 2020/0090480 | A1 * | 3/2020 | Sacre | G08B 13/19695 |
| 2020/0209377 | A1 * | 7/2020 | Ogura | G01S 13/08 |
| 2020/0294248 | A1 * | 9/2020 | Garrett | G06T 7/73 |
| 2021/0055378 | A1 * | 2/2021 | Van Haver | G01S 13/34 |
| 2021/0086767 | A1 * | 3/2021 | Matsunaga | B60W 10/20 |
| 2021/0088643 | A1 * | 3/2021 | Hayashi | G01S 13/88 |
| 2022/0043416 | A1 * | 2/2022 | Droitcour | F24F 11/61 |
| 2022/0113401 | A1 * | 4/2022 | Axley | G01S 7/023 |
| 2023/0243953 | A1 * | 8/2023 | Fujiya | G01S 13/86 702/152 |
| 2023/0306833 | A1 * | 9/2023 | Yoshizawa | G01S 7/4808 |
| 2024/0027604 | A1 * | 1/2024 | Lyu | G01S 7/40 |
| 2024/0203222 | A1 * | 6/2024 | Amir | G08B 13/19613 |

* cited by examiner

Boundary lookup table 6

| Distance(cm) |
| --- |
| 300 |
| 301 |
| 305 |
| ⋮ |
| 424 |
| ⋮ |
| 523 |
| 580 |
| 552 |
| ⋮ |
| 500 |
| ⋮ |
| 300 |

Boundary lookup table 5

| Angle | Distance(cm) |
| --- | --- |
| 0 | 300 |
| 5 | 301 |
| 10 | 305 |
| ⋮ | ⋮ |
| 45 | 424 |
| ⋮ | ⋮ |
| 55 | 523 |
| 60 | 580 |
| 65 | 552 |
| ⋮ | ⋮ |
| 90 | 500 |
| ⋮ | ⋮ |
| 180 | 300 |

External device

FIG. 6

Radar detector 102: position detecting mode

Radar detector 102: entry detecting mode

METHOD FOR AUTOMATICALLY ACTIVATING VIDEO CONFERENCE SYSTEM AND RELATED VIDEO CONFERENCE SYSTEM

BACKGROUND OF THE INVENTION

1. Field of the Invention

The present invention relates to a method for automatically activating video conference meeting system and related video conference meeting system, and more particularly, to an operation method for a video conference meeting system and related video conference meeting system capable of reducing power consumption.

2. Description of the Prior Art

The conventional video conference meeting device is usually composed of components, such as a display, a camera, a microphone, a speaker and an operation control interface, and the conventional video conference meeting device is incorporated with wired or wireless network to hold an online meeting with multiple parties. In order to achieve the scenario, a high performance computing processor with multiple functions is required for the conventional video conference meeting device, which consumes more power during operations. Some of the conventional video conference meeting devices utilize sensing components, e.g. a proximity sensor or a camera, to detect whether any user is present nearby, so as to determine whether to enter into or leave from a system standby state, which powers off components to save the power consumption. However, the detection coverages of the sensing components in the conventional video conference meeting devices cannot perfectly match physical spaces of various meeting rooms. Therefore, in the system standby state, the conventional video conference meeting devices cannot correctly determine whether any nearby user is present at the meeting rooms of where they locate or the nearby user just move outside the meeting rooms. In addition, the processors in the conventional video conference meeting devices are required to be power on for executing the operation task, which determine whether to leave from the system standby state automatically according to sensing signals from the sensing components, so the power consumptions of the conventional video conference meeting devices cannot be effectively reduced by the system standby state.

Therefore, improvements are necessary to the conventional technique.

SUMMARY OF THE INVENTION

In light of this, the present invention provides a method for automatically activating a video conference meeting system and related video conference meeting system to decrease the power consumption.

An embodiment of the present invention discloses a method for automatically activating a video conference meeting device, wherein the video conference meeting device includes a power supply, a main processor and a plurality of peripheral components, and a radar detector connects to the video conference meeting device, the method comprises (a) the radar detector detecting with a radar detection coverage when the video conference device is in a standby state; (b) when the radar detector detects an object appearing in the radar detection coverage, obtain a position of the object detected in the radar detection coverage; (c) the radar detector obtaining boundary information of an effective zone and determining whether the position of the detected object is within the effective zone; (d) when the radar detector determines that the position of the detected object is within the effective zone, activating the video conference meeting device which loads an operation program; and (e) when the radar detector determines that the position of the detected object is not within the effective zone, the radar detector does not activate the video conference meeting device from the standby state.

Another embodiment of the present invention discloses a video conference meeting system, comprises a video conference meeting device, comprises a power supply, configured to provide power for the video conference meeting device; and a main processor, configured to control the video conference meeting device; at least a peripheral component; and a radar detector, connected to the video conference meeting device, the radar detector comprises a detection processor and is configured to detect an object appearing in a radar detection coverage when the video conference meeting device is in a standby state; wherein the detection processor is configured to obtain a position of the object detected in the radar detection coverage and boundary information of an effective zone, and determine whether the position of the detected object is within the effective zone; wherein the detection processor is configured to inform the video conference meeting device to activate from the standby state when the detection processor determines the position of the detected object is within the effective zone; wherein the detection processor is configured to not inform the video conference meeting device to activate from the standby state when the detection processor determines the position of the detected object is not within the effective zone.

Another embodiment of the present invention discloses a video conference meeting system, comprises a video conference meeting device, comprises a power supply, configured to provide power for the video conference meeting device; and a main processor, configured to control the video conference meeting device; at least a peripheral component; and a radar detector, connected to the video conference meeting device, the radar detector comprises a detection processor and is configured to detect an object appearing in a radar detection coverage; wherein the main processor informs the radar detector to standby when the video conference meeting device is in an operating state; wherein the main processor informs the radar detector to activate when the video conference meeting device is no longer in the operating state; wherein the detection processor is configured to obtain a position of the object detected in the radar detection coverage and boundary information of an effective zone, and determine whether the position of the detected object is within the effective zone; wherein the detection processor is configured to inform the video conference meeting device to enter into a standby state when the detection processor determines there is no detected object in the effective zone; wherein the detection processor is configured to not inform the video conference meeting device to enter into a standby state when the detection processor determines the detected object being in the effective zone.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a schematic diagram of a boundary information of the effective zone from an external input according to an embodiment of the present invention.

DETAILED DESCRIPTION

Figure 1:
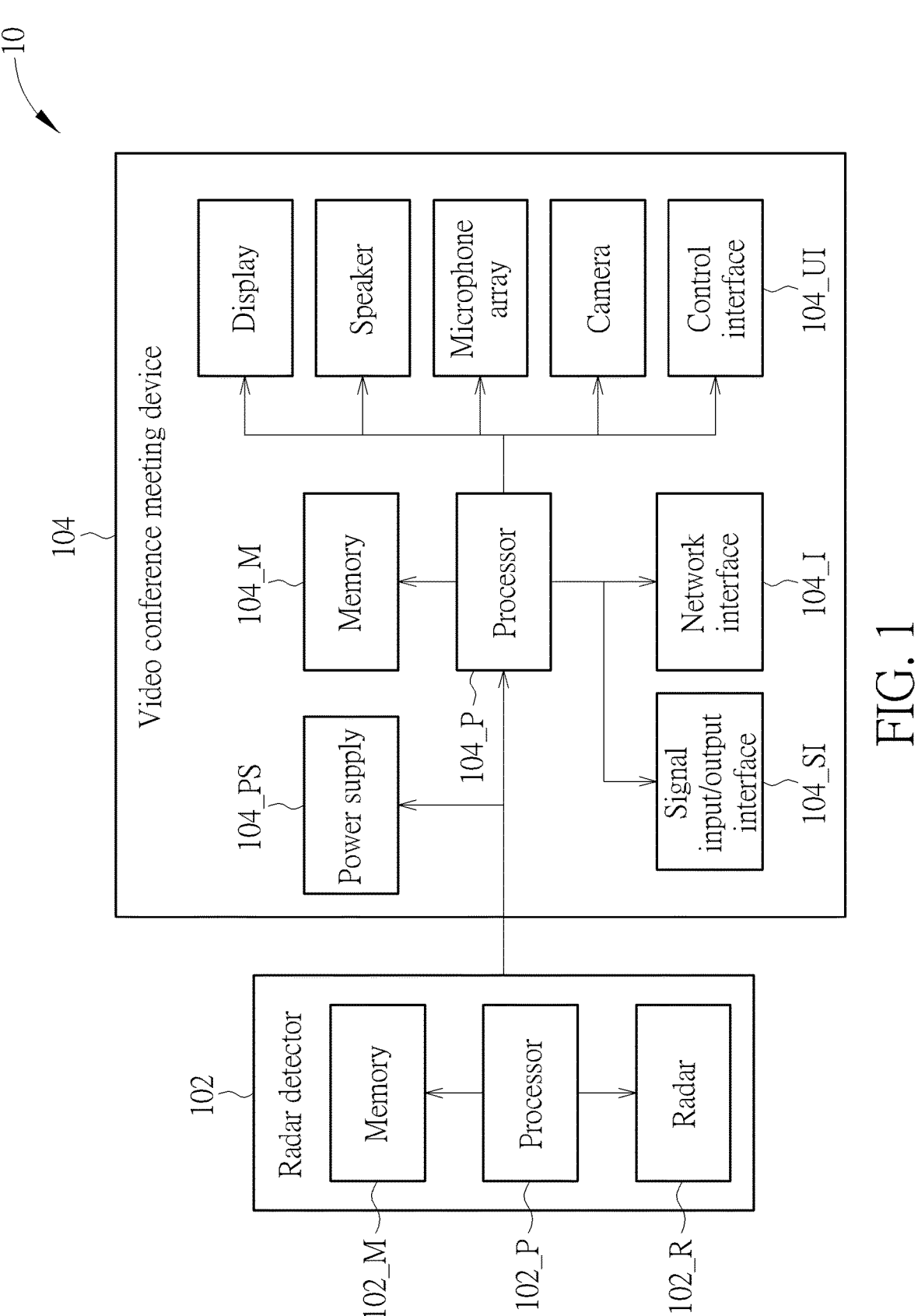
FIG. 1 is a schematic diagram of a video conference meeting system according to an embodiment of the present invention.

Please refer to FIG. 1, which is a schematic diagram of a video conference meeting system 10 according to an embodiment of the present invention. The video conference meeting system 10 is capable of video conferencing for users, which includes a radar detector 102 and a video conference meeting device 104. The radar detector 102 is coupled to the video conference meeting device 104, the radar detector 102 may include a memory 102_M, a processor 102_P and a radar 102_R. The radar detector 102 may detect a moving object within a radar detection range and determine a position of the object according to a signal strength of radar signal. In an embodiment of the present invention, the radar detector 102 may be utilized for determining whether the moving object is a person. The memory 102_M may be a flash memory or an electrically-erasable programmable read-only memory (EEPROM), the processor 102_P may be a microprocessor (µP) or a digital signal processor with extremely low power consumption for processing a detected output of the radar 102_R, so as to determine whether to notify the video conference meeting device 104 such that the video conference meeting device 104 enters into the standby state or wakes from the standby state. The radar 102_R may be a motion detecting radar for detecting a person or an object in same space where it locates. Therefore, the processor 102_P of the radar detector 102 may determine, based on a detected distance between the radar 102_R and the person or the object in the space, whether to inform the video conference meeting device 104 to enter into or wake from the standby state. When the video conference meeting device 104 is in standby state, the video conference meeting device 104 may be in a deep sleep mode or a power-off mode which reduce the power consumption, and the video conference meeting device 104 is powered on after waking from the standby state.

The video conference meeting device 104 may include a power supply 104_PS, a processor 104_P, a memory 104_M, a signal input/output interface 104_SI, an network interface 104_I, a control interface 104_UI and a plurality of peripheral devices. The power supply 104_PS may be a power supply device connected to the power source or a battery, and serves as a power source for the video conference meeting device 104. Similarly, the power source of the radar detector 102 may be provided by the video conference meeting device 104, an independent battery or other power source device.

The processor 104_P may be a processor with high performance computing ability, the memory 104_M may be a double data rate synchronous dynamic random access memory (DDR SDRAM) or a flash memory, the signal input/output interface 104_SI may be a data interface of the video conference meeting device 104 for receiving or transmitting the data. The network interface 104_I may be a wired network or a wireless network interface, such that the video conference meeting device 104 may be connected to the internet for remote cloud meeting. The control interface 104_UI may provide various control interfaces for usage scenarios of the video conference meeting device 104, wherein the control interfaces 104_UI include a variety of function items or setting options. As shown in FIG. 1, the peripheral devices may be built-in devices of the video conference meeting device 104, e.g. a display, a speaker, a microphone array and a camera, but not limited thereto. In addition, the peripheral devices may be external devices connected to the video conference meeting device 104 via signal lines or wireless network.

In order to reduce the power consumption of the video conference meeting system 10 when the video conference meeting device 104 is not in use, the video conference meeting device 104 in the standby state according to an embodiment of the present invention is in a power-off mode or a deep sleep mode. For example, when the video conference meeting device 104 is in the power-off mode, only the power supply 104_PS of the video conference meeting device 104 receives the power from the power source. When the radar detector 102 determines to wake up the video conference meeting device 104 from the power-off mode, the power supply 104_PS of the video conference meeting device 104 is informed to supply power to the internal components and devices, such that the video conference meeting device 104 will boot up and enter into an operating state.

In another embodiment, when the video conference meeting device 104 is in the deep sleep mode, only the power supply 104_PS and the processor 104_P of the video conference meeting device 104 receive the power from the power source. When the radar detector 102 determines to wake up the video conference meeting device 104 from the deep sleep mode, the video conference meeting device 104 is informed to supply power to the internal components and devices, such that the processor 104_P of the video conference meeting device 104 will enter into an operating state.

Notably, when the abovementioned video conference meeting device 104 is not in an operating state, the radar detector 102 is in the operating state and keeps detecting any object in the radar detection coverage.

Compared to the conventional technique, the video conference meeting system. 10 according to an embodiment of the present invention includes the radar detector 102, which utilizes a low power consumption processor 102_P to control the power supply 104_PS and the processor 104_P of the video conference meeting device 104, such that the video conference meeting device 104 can be switched from the deep sleep mode or the power-off mode to an operating state automatically.

In order to determine whether to power on or wake the video conference meeting device 104, the radar detector 102 of the video conference meeting system 10 may perform radar detection, in an entry detecting mode at extremely low power consumption, for the space it located. Meanwhile, the power consumption of the processor 102_P is less than 0.1 watt (W) during the entry detecting mode. When a person exists in the space where the radar detector 102 is located, the radar detector 102 is switched to a position detecting mode to determine whether to wake or power on the video conference meeting device 104 or not, and the power consumption of the processor 102_P is around 0.3 watts during the position detecting mode.

Notably, when the radar detector 102 in the entry detecting mode performs detection for a radar detection coverage, the radar detection coverage may be larger than the physical space where the radar detector 102 is located. Therefore, after the radar detector 102 is switched to the position detecting mode, the radar detector 102 determines whether at least one person is detected at an effective zone in order to determine whether to automatically wake up or power on the video conference meeting device 104 and load a conference meeting program. The effective zone may be the meeting room, the office, or any part of an indoor space where the radar detector 102 is located. The radar detector 102 may define the boundaries of the effective zone based on angles and distances of the space to be detected.

Figure 2:
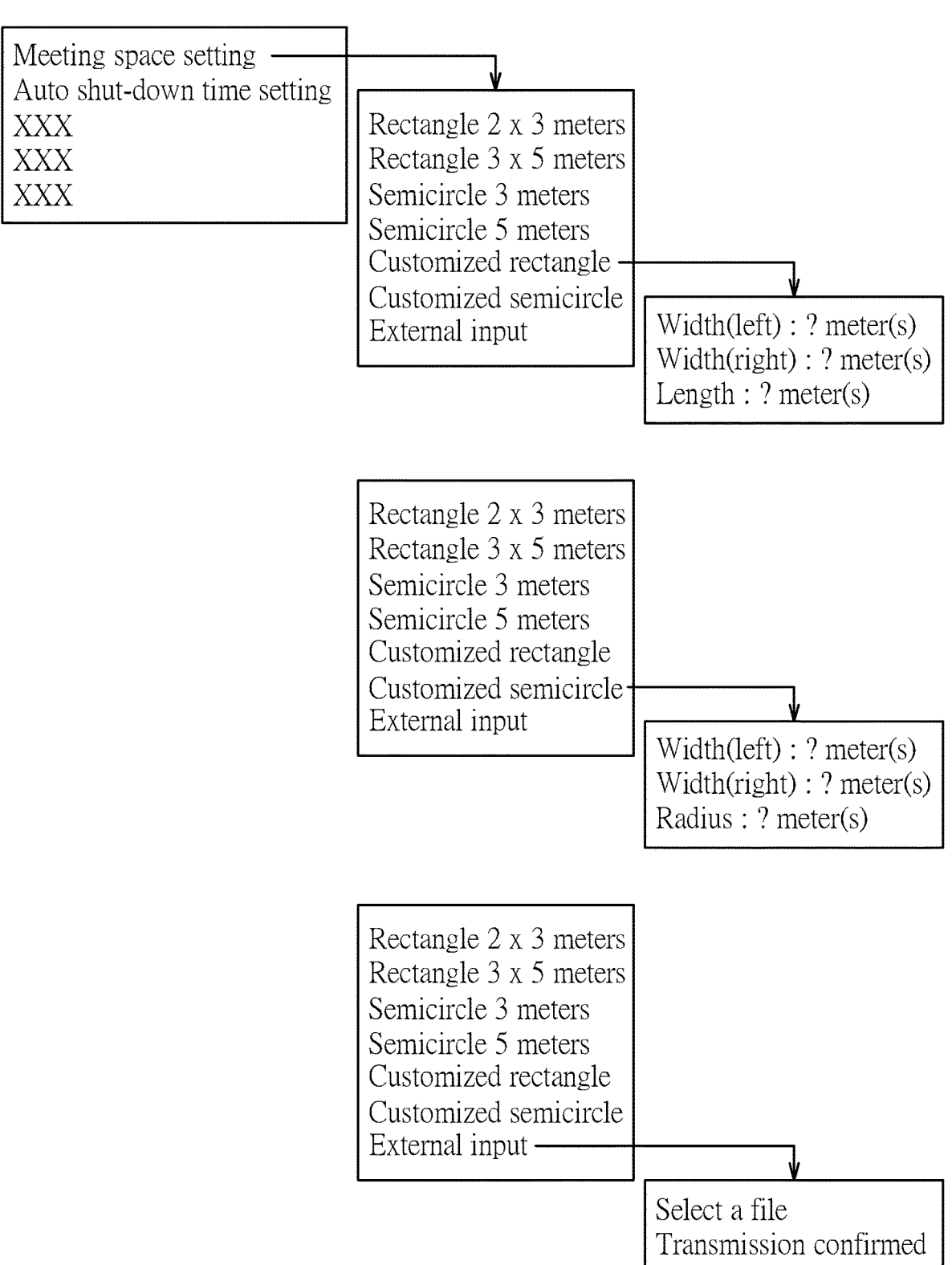
FIG. 2 and FIG. 3 are schematic diagrams of geometric range settings of an effective zone according to an embodiment of the present invention.
Figure 3:
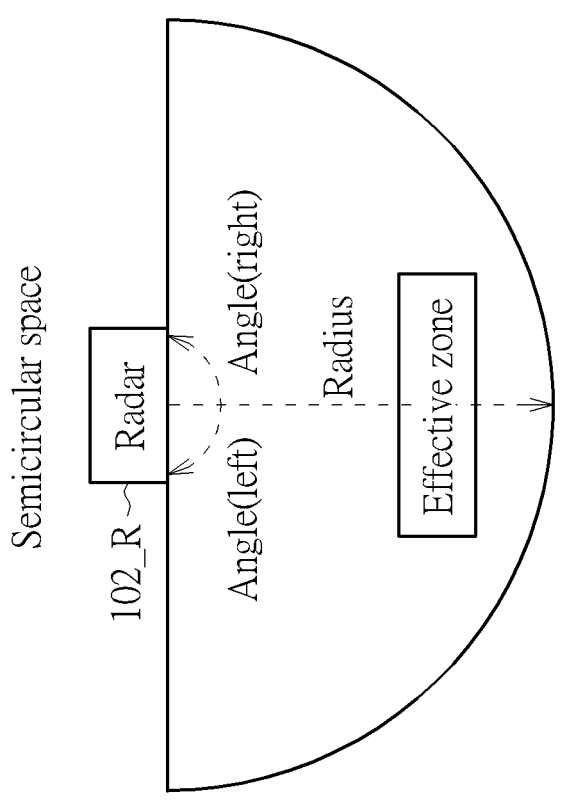
Figure 3:
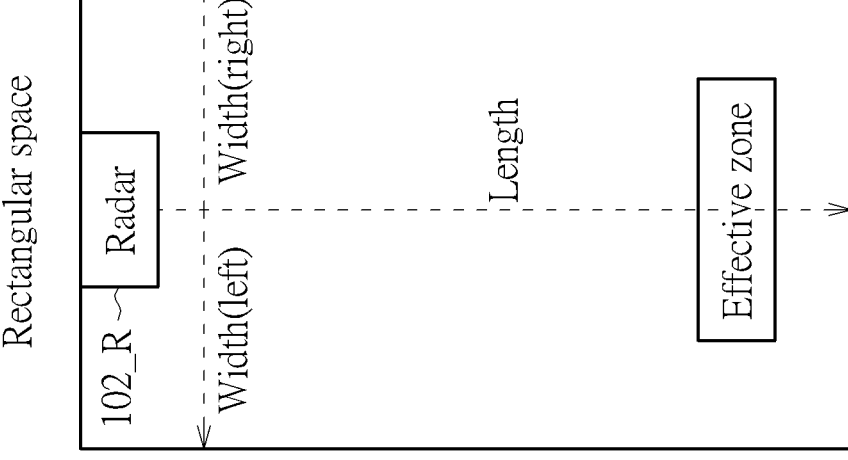

For example, please refer to FIG. 2 and FIG. 3, which are schematic diagrams of geometric boundary settings of an effective zone according to an embodiment of the present invention. The video conference meeting system 10 according to an embodiment of the present invention may provide an on-screen display (OSD) menu for users to set the boundaries of the effective zone. As shown in FIG. 2, the OSD menu includes an option for setting meeting space, which further includes options for setting boundaries of a specific zone, e.g. a 2 meters×3 meters rectangle and a semicircle with radius of 3 meters, and options for customized settings boundaries of a rectangle or semicircle. The c options for customized settings boundaries include settings for geometric information, such as width, length and angle. The OSD menu may also include an option for setting the effective zone by importing boundary information from an external source.

Assume that the above-mentioned effective zone is a meeting room, the user may operate the OSD menu to select options or input the boundary of the meeting room, which is defined by a Cartesian coordinate system, i.e. X-Y coordinates, with the position of the radar detector 102 as the origin. The processor 102_P or the processor 104_P may convert the geometric coordinates into angle and distance information of the boundary, i.e. polar coordinates. Please refer to FIG. 4 and FIG. 5, which illustrate the polar coordinate conversion for the boundary of the effective zone according to an embodiment of the present invention.

Figure 4:
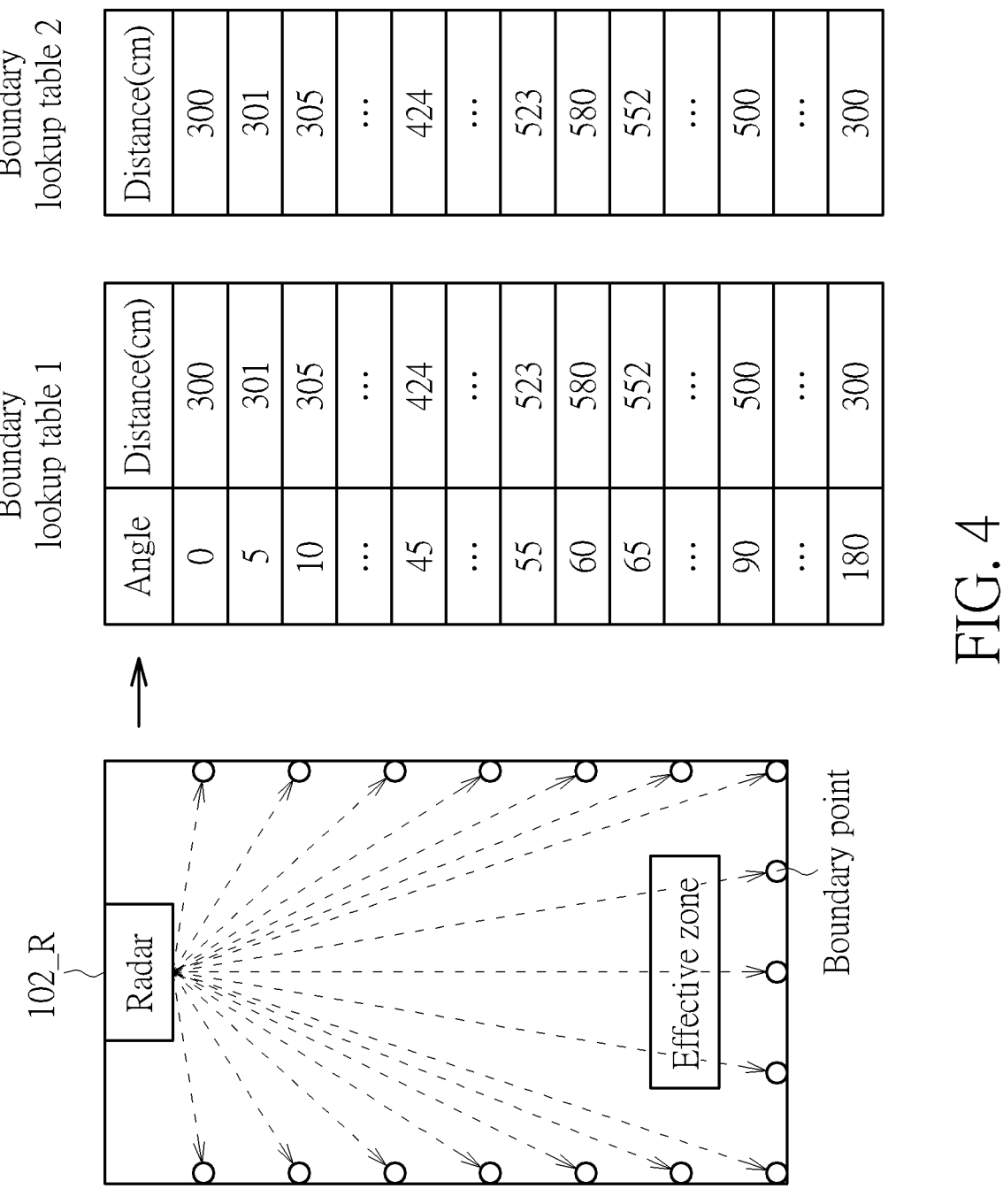
FIG. 4 and FIG. 5 are schematic diagrams of polar coordinate conversion for the boundary of the effective zone according to an embodiment of the present invention.

As shown in FIG. 4, when the effective zone is a rectangular space, e.g. a rectangular meeting room, the relations of angles and distances taken from the radar detector 102 of the video conference meeting system. 10 to the boundary of the meeting room can be converted into a corresponding boundary lookup table 1, i.e. the relative distances taken from the radar detector 102 at certain angles to the boundary points of the effective zone. Alternatively, when the angles to be detected in the boundary detection settings of the radar detector 102 are default fixed angle degrees, the angle degrees of the boundary detection may be omitted in the boundary lookup table and the stored boundary information in the boundary lookup table only includes relative distances from the radar detector 102 to the boundary points of the effective zone, which are listed in sequential order corresponding to the default fixed angle degrees, as shown in a boundary lookup table 2.

Figure 5:
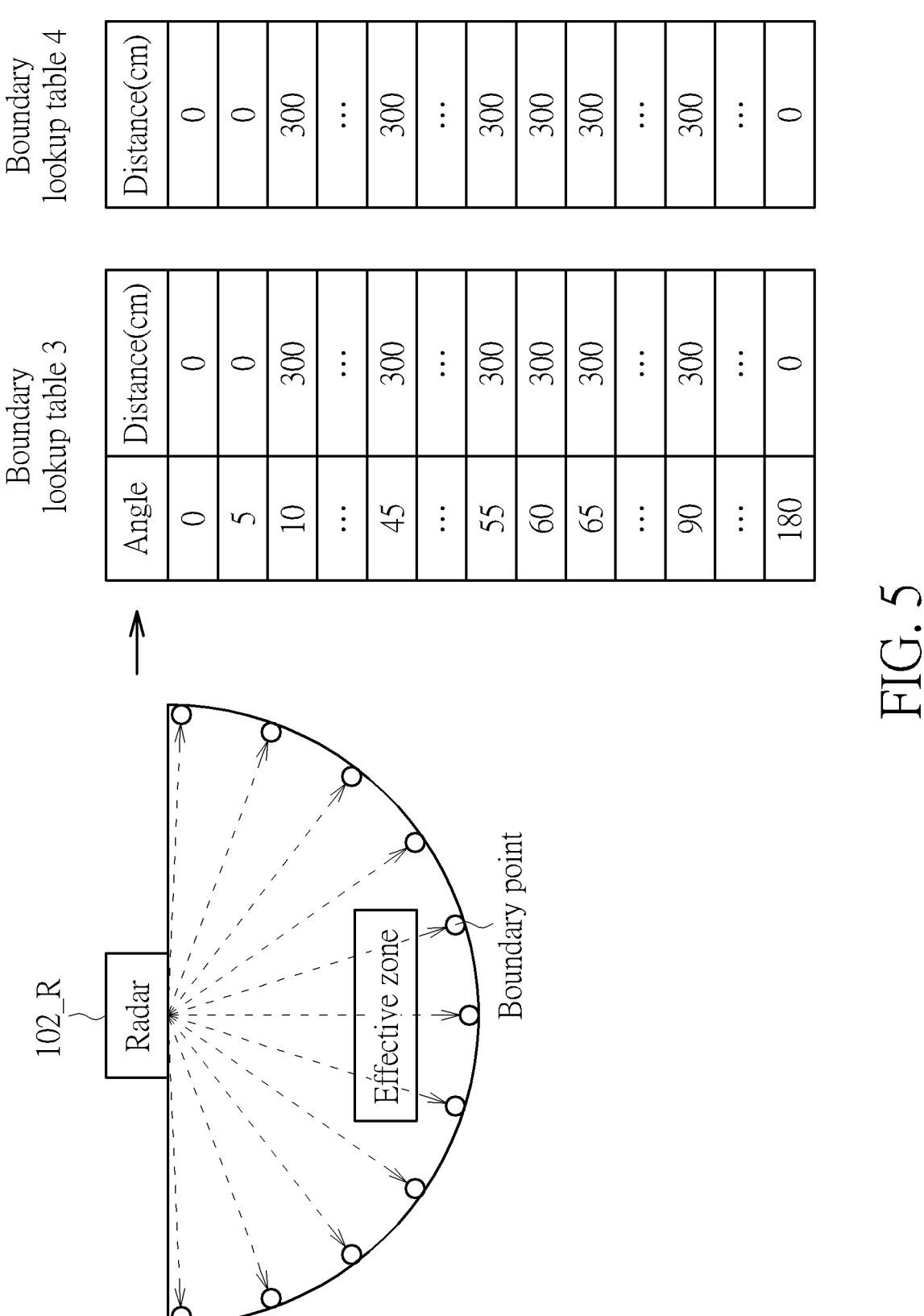

In another embodiment, as shown in FIG. 5, when the effective zone is a semicircle space, e.g. a semicircular meeting room, the relations of angles and distances taken from the radar detector 102 of the video conference meeting system 10 to the boundary of the meeting room can be converted into a corresponding boundary lookup table 1, i.e. the relative distances taken from the radar detector 102 at certain angles to the boundary points of the effective zone. Alternatively, when the angles to be detected in the boundary detection settings of the radar detector 102 are default fixed angle degrees, the angle degrees of the boundary detection may be omitted in the boundary lookup table and the stored boundary information in the boundary lookup table only includes distances from the radar detector 102 to the boundary points of the effective zone, which are listed in sequential order corresponding to the default fixed angle degrees, as shown in a boundary lookup table 4.

As for the boundary information of the effective zone imported from an external source, please refer to FIG. 6. A boundary lookup table 5 or a boundary lookup table 6 of the effective zone may be input by or received from an external device, e.g. a personal computer, tablet or mobile device, via the signal input/output interface 104_SI to the video conference meeting device 104, but not limited thereto. In another embodiment, the user may input the geometric boundary of the effective zone and relative position of the radar detector 102 via the external device, which are automatically converted into the boundary lookup table by the video conference meeting device 104. Alternatively, the user may upload the geometric boundary of the effective zone and the relative position of the radar detector 102 to a server, such that the video conference meeting device 104 may obtain the boundary information to the boundary lookup table from a server via the network. In another embodiment, the meeting space setting options of the OSD menu include an option of "detecting the effective zone", which activates an effective zone detection mode of the radar detector 102. The radar detector 102 detects the range of the user's movements as the boundary of the effective zone after the effective zone detection mode is activated. The user may turn off the effective zone detection mode by operating the video conference meeting device 104 or the radar detector 102 after the detection is completed. Alternatively, the effective zone detection mode may be turned on/off by operating an external device connected to the radar detector 102. After the detection is completed, the radar detector 102 transmits the range of the user's movements to the video conference meeting device 104, and the range of the user's movements is converted into the boundary lookup table by the video conference meeting device 104 or by the radar detector 102, but not limited thereto. In an embodiment, the video conference meeting device 104 may detect the range of the user's movements or an external device's movements to determine the boundary information of the effective zone.

The boundary lookup tables 1-6 may be stored in the memory 104_M of the video conference meeting device 104, and transmitted to the memory 102_M of the radar detector 102 via the signal input/output interface 104_SI. Therefore, the radar detector 102 may compare the real-time detected radar signals with the boundary information of the effective zone and determine whether any person exists in the effective zone, so as to automatically wake up the video conference meeting device 104 for video conferencing.

Figure 7:
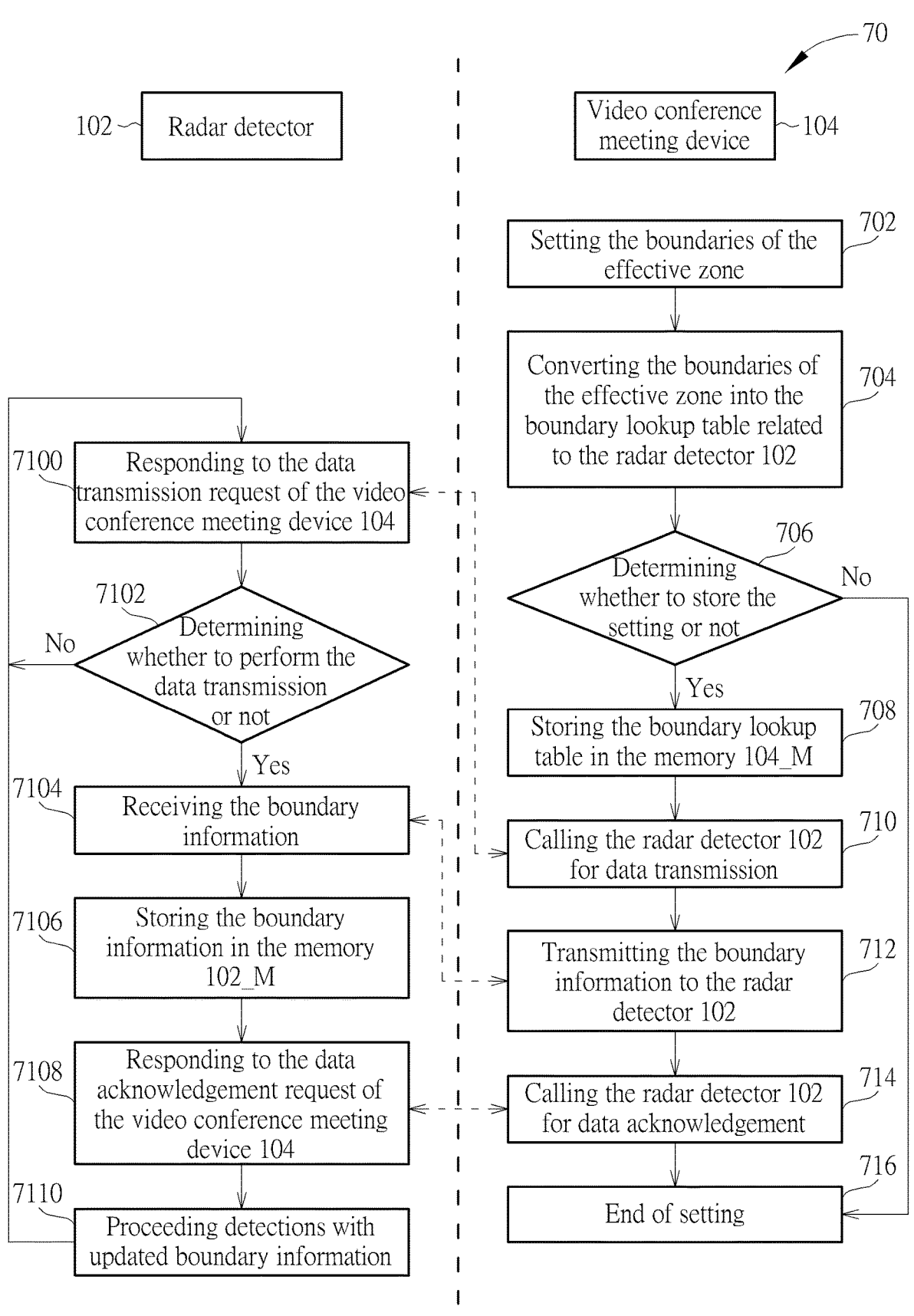
FIG. 7 is a schematic diagram of a setting method of the effective zone according to an embodiment of the present invention.

The above-mentioned setting process of the effective zone can be summarized as an effective zone setting method 70 shown in FIG. 7. The effective zone setting method 70 includes the following steps:

Step 702: Setting the boundaries of the effective zone;

Step 704: Converting the boundaries of the effective zone into the boundary lookup table related to the radar detector 102;

Step 706: Determining whether to store the setting or not, if yes, goes to step 708; if no, goes to step 716;

Step 708: Storing the boundary lookup table in the memory 104_M;

Step 710: Calling the radar detector 102 for data transmission;

Step 7100: Responding to the data transmission request of the video conference meeting device 104;

Step 7102: Determining whether to perform the data transmission or not, if yes, goes to step 7104; if no, goes to step 7100;

Step 7104: Receiving the boundary information;

Step 7106: Storing the boundary information in the memory 102_M;

Step 7108: Responding to the data acknowledgement request of the video conference meeting device 104;

Step 7110: Proceeding detections with updated boundary information;

Step 712: Transmitting the boundary information to the radar detector 102;

Step 714: Calling the radar detector 102 for data acknowledgement;

Step 716: End of setting.

According to the effective zone setting method 70, the radar detector 102 may simultaneously update the most recent boundary information obtained by the video conference meeting device 104. The operations performed in the effective zone setting method 70 can refer to the above-mentioned embodiments of video conference meeting system 10, the setting options of the effective zones and the generations of the boundary information, which are not narrated herein again for brevity.

Figure 8:
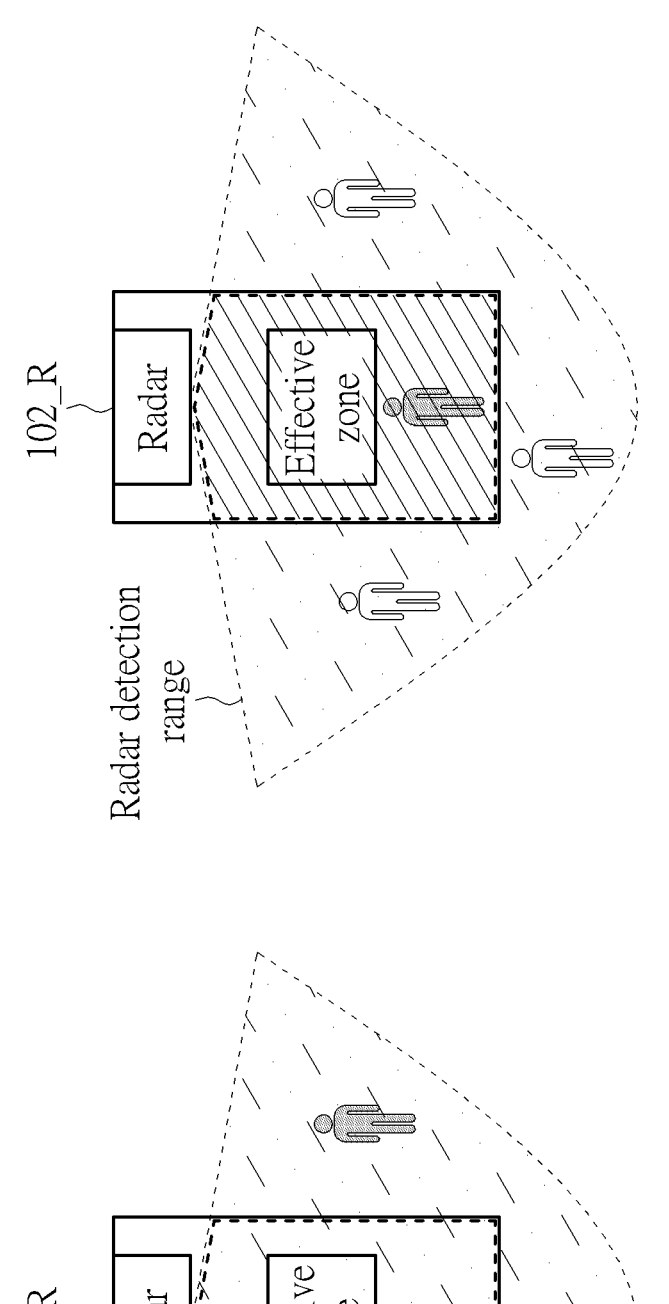
FIG. 8 is a schematic diagram of a mode switching of a radar detector according to an embodiment of the present invention.

Please refer to FIG. 8, which is a schematic diagram illustrating detecting mode switching of the radar detector 102 according to an embodiment of the present invention. As shown in FIG. 8, the radar detection range is larger than the effective zone. The radar detector 102 performs detection with the radar detection range when operating in the entry detecting mode. When at least a person is detected by the radar detector 102 in the radar detection range, the radar detector 102 switches operating mode to the position detecting mode and determines whether the at least one person appears in the effective zone or not.

In details, when the radar detector 102 is operating in the entry detecting mode, the radar detector 102 detects whether any person enters and stays in the radar detection range with extremely low power consumption. After it is determined that the person appears in the radar detection range, the radar detector 102 switches to the position detecting mode, wherein the angle/distance (polar coordinates) of the person relative to the radar detector 102 is detected. For example, when the radar detector 102 in FIG. 8 detects that at least one person appears in the radar detection range, the radar detector 102 switches to the position detecting mode, such that radar detector 102 detects the angle/distance value corresponding to the at least one detected person who may appear in the effective zone.

Then, the radar detector 102 compares the angle/distance value of the at least one detected person with the boundary information of the effective zone, e.g. the boundary lookup table, stored in the memory 102_M of the radar detector 102 to determine whether the at least one detected person appears in the effective zone or not. In this regard, when the radar detector 102 determines that the at least one detected person appears in the effective zone, the video conference meeting device 104 should be powered on or awakened from the deep sleep mode or the power off mode and load the operating program such that the video conference meeting device 104 is ready to be operated by the user.

Figure 9:
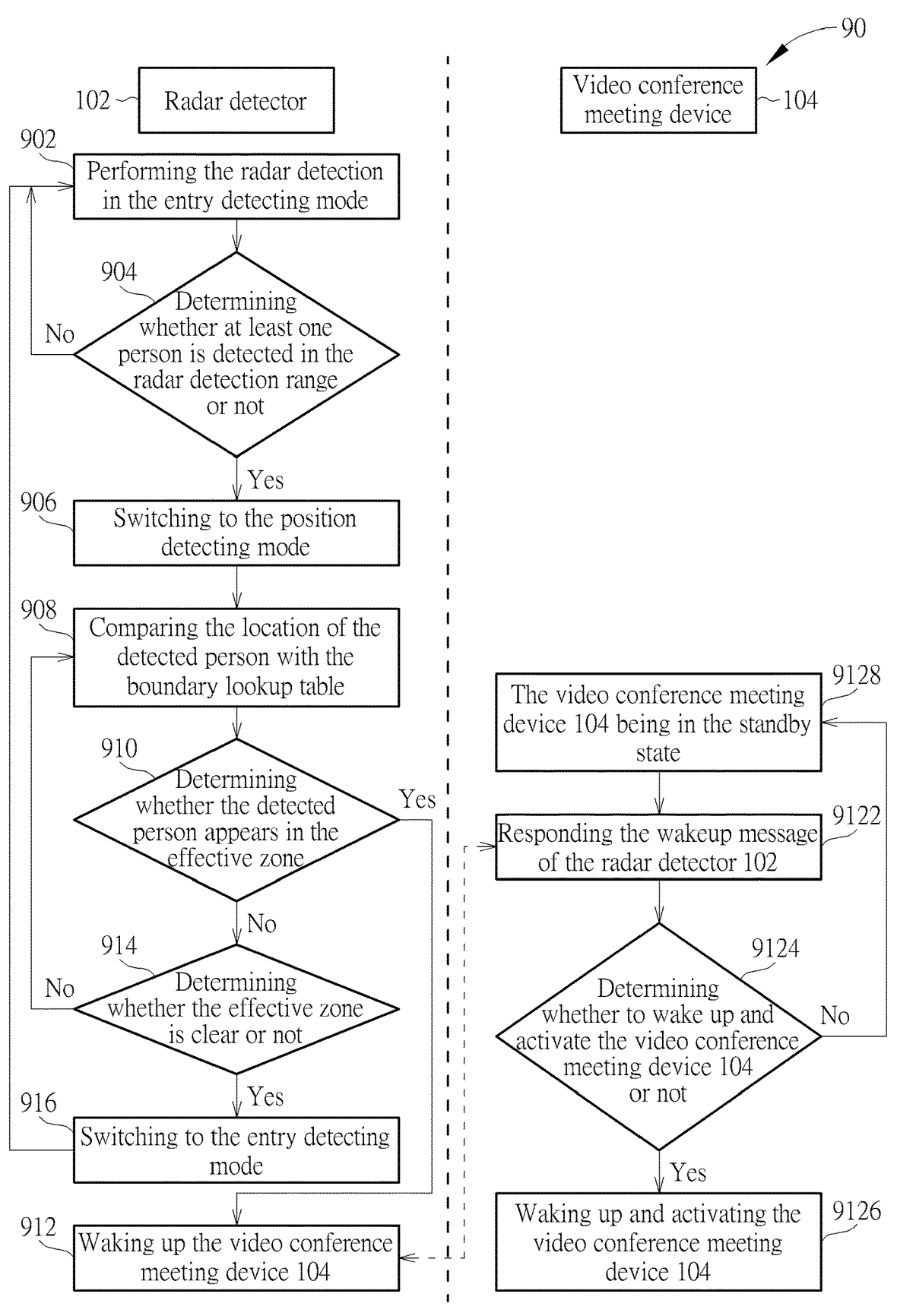
FIG. 9 is a schematic diagram of a mode switching method according to an embodiment of the present invention.

The steps performed in detection mode switching process of the radar detector 102 may be summarized to a mode switching method 90, as shown in FIG. 9. The mode switching method 90 includes the following steps:

Step 902: Performing the radar detection in the entry detecting mode;

Step 904: Determining whether at least one person is detected in the radar detection range or not, if yes, goes to step 906; if no, goes to step 902;

Step 906: Switching to the position detecting mode;

Step 908: Comparing the location of the detected person with the boundary lookup table;

Step 910: Determining whether the detected person appears in the effective zone;

Step 912: Waking up the video conference meeting device 104;

Step 9122: Responding the wakeup message of the radar detector 102;

Step 9124: Determining whether to wake up and activate the video conference meeting device 104 or not, if yes, goes to step 9126; if no, goes to step 9128;

Step 9126: Waking up and activating the video conference meeting device 104;

Step 9128: The video conference meeting device 104 being in the standby state;

Step 914: Determining whether the effective zone is clear or not, if yes goes to step 916; if no, goes to step 908;

Step 916: Switching to the entry detecting mode.

In an embodiment, when the video conference meeting device 104 is awakened in step 9126, the video conference meeting device 104 loads default application programs, e.g. the conferencing application, but not limited thereto. The operations performed in the mode switching method 90 can refer to the above-mentioned embodiments of radar detector 102, which are not narrated herein again for brevity.

When the video conference meeting, e.g. a cloud meeting or a local meeting, is finished, the video conference meeting device 104 may activate the position detecting mode of the radar detector 102 again to make sure that everyone has left the effective zone. After a pre-determined standby time period, e.g. 10 minutes, has elapsed and no one has appeared in the effective zone, the radar detector 102 generates a command to the video conference meeting device 104 to automatically perform a deep sleep or power-off process. At that time, the processor 102_P of the radar detector 102 may inform the video conference meeting device 104 to standby, and the video conference meeting device 104 enters the deep sleep mode or the power-off mode. After the radar detector 102 determines that no one appears in the effective zone, the radar detector 102 switches to the entry detecting mode. In an embodiment, the user may utilize the options of the OSD menu to set the standby time period of the video conference meeting device 104. In an embodiment, the video conference meeting device 104 may enter the deep sleep mode, which automatically powers off the components other than the processer and the power supply, such as the display screen, the speaker array or the camera, when the user does not use the video conference meeting device 104 over the standby time period, even though the user is still in the effective zone. The video conference meeting device 104 may be activated from the deep sleep mode when being awakened by the user or when any new user enters the effective zone. In an embodiment, the video conference meeting device 104 may enter the power-off mode, which automatically powers off the components other than the power supply, when the user does not use the video conference meeting device 104 over the standby time period, even though the user is still in the effective zone. The video conference meeting device 104 may be powered-on from the power-off mode when being awakened by the user or when any new user enters the effective zone. In an embodiment, the user can utilize the options of the OSD menu to set the video conference meeting device 104 to enter the deep sleep mode or power-off mode in the standby state. In addition, a first standby time period of the video conference meeting device 104 may be set for automatically entering the deep sleep mode in the standby state, and a second standby time period of the video conference meeting device 104 may be set for automatically entering the power-off mode in the standby state.

In an embodiment, the video conference meeting device 104 may activate the position detecting mode of the radar detector 102 according to a power-off message or an end-of-meeting message, such that video conference meeting device 104 can determine the effective zone is clear and everyone has left.

Figure 10:
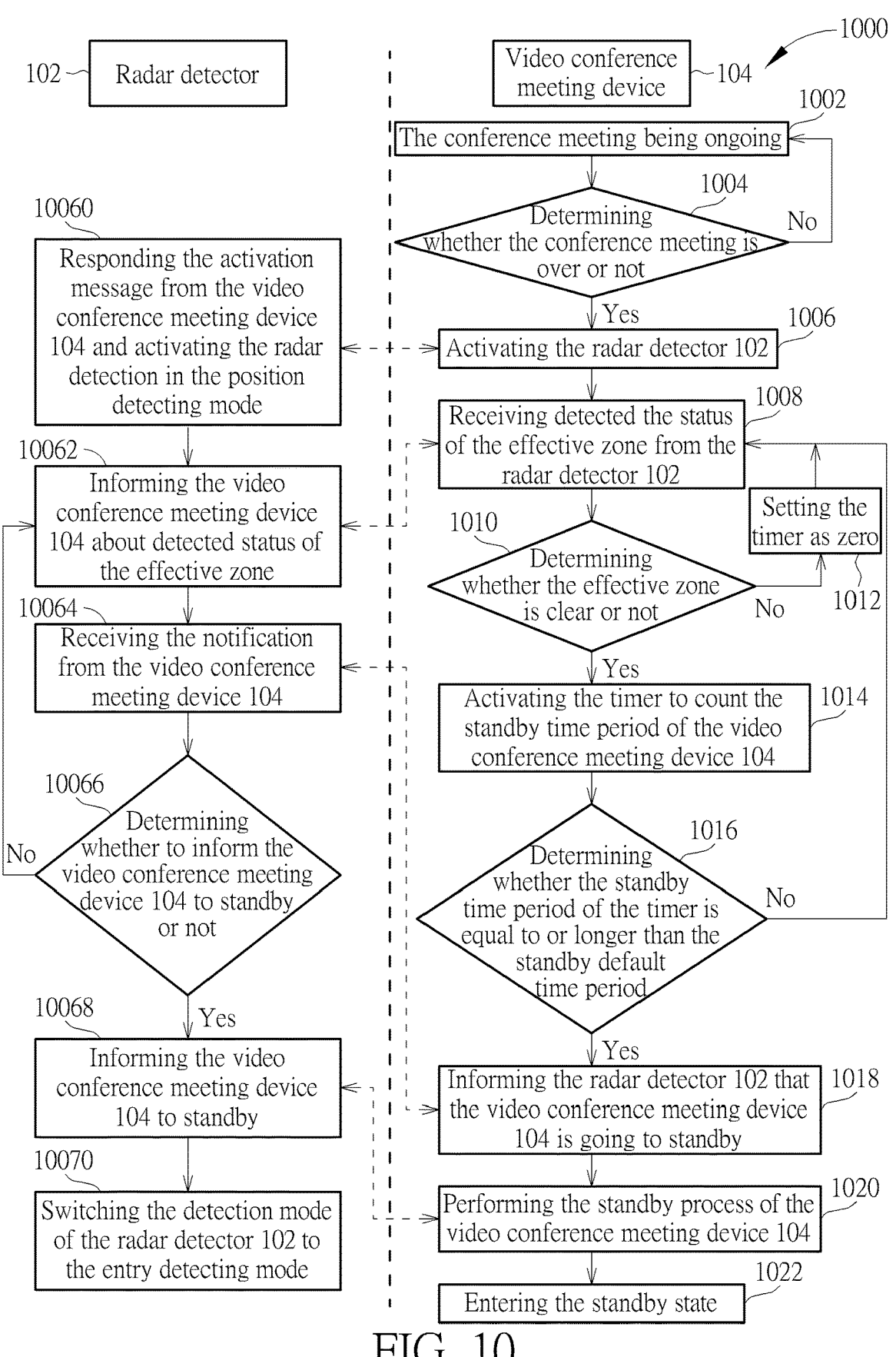
FIG. 10 is a schematic diagram of an operation method according to an embodiment of the present invention.

In addition, the steps performed in above-mentioned operation process of the video conference meeting system 10 may be summarized to an operation method 1000, as shown in FIG. 10. The operation method 1000 includes the following steps:

Step 1002: The conference meeting being ongoing;

Step 1004: Determining whether the conference meeting is over or not, if yes, goes to step 1006; if no, goes to step 1002;

Step 1006: Activating the radar detector 102;

Step 10060: Responding the activation message from the video conference meeting device 104 and activating the radar detection in the position detecting mode;

Step 10062: Informing the video conference meeting device 104 about detected status of the effective zone;

Step 10064: Receiving the notification from the video conference meeting device 104;

Step 10066: Determining whether to inform the video conference meeting device 104 to standby or not, if yes, goes to step 10068; if no, goes to step 10062;

Step 10068: Informing the video conference meeting device 104 to standby;

Step 10070: Switching the detection mode of the radar detector 102 to the entry detecting mode;

Step 1008: Receiving detected the status of the effective zone from the radar detector 102;

Step 1010: Determining whether the effective zone is clear or not, if yes, goes to step 1014; if no, goes to step 1012;

Step 1012: Setting the timer as zero;

Step 1014: Activating the timer to count the standby time period of the video conference meeting device 104;

Step 1016: Determining whether the standby time period of the timer is equal to or longer than the standby default time period, if yes, goes to step 1018; if no, goes to step 1008;

Step 1018: Informing the radar detector 102 that the video conference meeting device 104 is going to standby;

Step 1020: Performing the standby process of the video conference meeting device 104;

Step 1022: Entering the standby state.

The operation process of the operation method 1000 performed by the video conference meeting system 10 can refer to the abovementioned embodiments of the video conference meeting system 10, and not narrated herein again. Notably, when the user is utilizing the video conference meeting device 104, e.g. attending a video conference meeting, the video conference meeting device 104 notifies the radar detector 102 to turn-off the radar detection function to reduce the power consumption. When the video conference meeting device 104 is not utilized by the user, the radar detector 102 is activated by the video conference meeting device 104 in step 1006.

Notably, those skilled in the art may properly design the conference meeting device based on various system requirements. For example, the user interface to set the effective zone and convert the boundaries of the effective zone, the mode switching method of the radar detector, and other features may be modified according to requirements of the system or the users, and not limited thereto, which are all within the scope of the present invention.

In summary, the present invention provides an operation method for a video conference meeting system and related video conference meeting system, which automatically turns on/off the video conference meeting device with a radar detection to increase convenience and decrease power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for automatically activating a video conference meeting device, wherein the video conference meeting device includes a power supply, a main processor and a plurality of peripheral components, and a radar detector connects to the video conference meeting device, the method comprising steps of:

(a) the radar detector detecting within a radar detection coverage concurrently with the video conference device being in a standby state;

(b) detecting an object appearing in the radar detection coverage by the radar detector, a position of the object detected in the radar detection coverage is obtained;

(c) the radar detector obtaining boundary information of an effective zone and determining whether the position of the detected object is within the effective zone;

(d) determining that the position of the detected object is within the effective zone by the radar detector, the video conference meeting device which loads an operation program is activated; and (e) determining that the position of the detected object is not within the effective zone by the radar detector, the video conference meeting device is not activated from the standby state by the radar detector;

wherein the boundary information of the effective zone is defined by a geometric coordinates system and is determined according to angle and distance information related to the radar detector;

wherein the radar detector is the only one radar detector in operation within the effective zone;

wherein only the main processor and the power supply of the video conference meeting device receive power and the plurality of peripheral components are power-off concurrently with the video conference meeting device being in the standby state; determining at least one person appears in the effective zone by the radar detector, the video conference meeting device is woken up from power off by the radar detector.

2. The method of claim 1, wherein the radar detector detects with the radar detection coverage for entry detecting when the video conference device is in the standby state.

3. The method of claim 2, wherein the radar detector detects the position of the object when the radar detector detects the object appearing in the radar detection coverage and obtains the position of the object detected in the radar detection coverage for determining whether the position of the object detected is within the effective zone; wherein the boundary information of the effective zone is determined according to a boundary lookup table, related to the radar detector; wherein the boundary lookup table includes only distance information at predetermined fixed angles of the radar detector relative to the effective zone.

4. The method of claim 3, further comprising steps of:
(f) the video conference meeting device informing the radar detector to standby when the video conference meeting device is in an operating state; and
(g) the video conference meeting device informing the radar detector for detecting the position of the object for determining whether the position of the object detected is within the effective zone when the video conference meeting device is no longer in the operating state.

5. The method of claim 1, wherein only the power supply of the video conference meeting device receives power, and the main processor and the plurality of peripheral components are power-off when the video conference meeting device in the standby state.

6. The method of claim 1, further comprising step of:
the radar detector generating a command to the video conference meeting device to automatically perform a deep sleep or power-off process after a pre-determined standby time period has elapsed and no object has been detected in the effective zone.

7. The method of claim 1, further comprising step of:
the radar detector informing the power supply of the video conference meeting device to supply power to the plurality of peripheral components when the radar detector determines to wake up the video conference meeting device from the standby state.

8. A video conference meeting system, comprising:
a video conference meeting device, comprises:
a power supply, configured to provide power for the video conference meeting device; and
a main processor, configured to control the video conference meeting device;
at least a peripheral component; and
a radar detector, connected to the video conference meeting device, the radar detector comprises a detection processor and is configured to detect an object appearing in a radar detection coverage concurrently with the video conference meeting device is in a standby state;
wherein the detection processor is configured to obtain a position of the object detected in the radar detection coverage and boundary information of an effective zone, and determine whether the position of the detected object is within the effective zone;
wherein the detection processor is configured to inform the video conference meeting device to activate from the standby state concurrently with the detection processor determines the position of the detected object is within the effective zone;

wherein the detection processor is configured to not inform the video conference meeting device to activate from the standby state concurrently with the detection processor determines the position of the detected object is not within the effective zone;

wherein the boundary information of the effective zone is defined by a geometric coordinates system and is determined according to angle and distance information related to the radar detector;

wherein the radar detector is the only one radar detector in operation within the effective zone;

wherein only the main processor and the power supply of the video conference meeting device receive power and the plurality of peripheral components are power-off concurrently with the video conference meeting device being in the standby state; determining at least one person appears in the effective zone by the radar detector, the video conference meeting device is woken up from power off by the radar detector.

9. The video conference meeting system of claim 8, wherein the radar detector detects with the radar detection coverage for entry detecting when the video conference device is in the standby state.

10. The video conference meeting system of claim 9, wherein the radar detector detects the position of the object and obtains the position of the object detected in the radar detection coverage for determining whether the position of the object detected is within the effective zone when the radar detector detects the object appearing in the radar detection coverage; wherein the boundary information of the effective zone is determined according to a boundary lookup table, related to the radar detector; wherein the boundary lookup table includes only distance information at predetermined fixed angles of the radar detector relative to the effective zone.

11. The video conference meeting system of claim 10, wherein the video conference meeting device informs the radar detector to standby when the video conference meeting device is in an operating state, and the video conference meeting device informs the radar detector for detecting the position of the object for determining whether the position of the object detected is within the effective zone when the video conference meeting device is no longer in the operating state.

12. The video conference meeting system of claim 8, wherein only the power supply of the video conference meeting device receives power, and the main processor and the plurality of peripheral components are power-off when the video conference meeting device in the standby state.

13. A video conference meeting system, comprising:
a video conference meeting device, comprises:
a power supply, configured to provide power for the video conference meeting device; and
a main processor, configured to control the video conference meeting device;
at least a peripheral component; and
a radar detector, connected to the video conference meeting device, the radar detector comprises a detection processor and is configured to detect an object appearing in a radar detection coverage;
wherein the main processor informs the radar detector to standby concurrently with the video conference meeting device is in an operating state;

wherein the main processor informs the radar detector to activate concurrently with the video conference meeting device is no longer in the operating state;

wherein the detection processor is configured to obtain a position of the object detected in the radar detection coverage and boundary information of an effective zone, and determine whether the position of the detected object is within the effective zone;

wherein the detection processor is configured to inform the video conference meeting device to enter into a standby state concurrently with the detection processor determines there is no detected object in the effective zone;

wherein the detection processor is configured to not inform the video conference meeting device to enter into a standby state concurrently with the detection processor determines the detected object being in the effective zone;

wherein the boundary information of the effective zone is defined by a geometric coordinates system and is determined according to angle and distance information related to the radar detector;

wherein the radar detector is the only one radar detector in operation within the effective zone;

wherein only the main processor and the power supply of the video conference meeting device receive power and the plurality of peripheral components are power-off concurrently with the video conference meeting device being in the standby state; determining at least one person appears in the effective zone by the radar detector, the video conference meeting device is woken up from power off by the radar detector.

14. The video conference meeting system of claim 13, wherein the radar detector detects with the radar detection coverage for entry detecting when the video conference device is in the standby state.

15. The video conference meeting system of claim 14, wherein the radar detector detects the position of the object and obtains the position of the object detected in the radar detection coverage for determining whether the position of the object detected is within the effective zone when the radar detector detects the object appearing in the radar detection coverage; wherein the boundary information of the effective zone is determined according to a boundary lookup table, related to the radar detector; wherein the boundary lookup table includes only distance information at predetermined fixed angles of the radar detector relative to the effective zone.

16. The video conference meeting system of claim 13, wherein the video conference meeting device automatically performs a deep sleep or power-off process after a predetermined standby time period has elapsed and the radar detector informs no object has been detected in the effective zone.

17. The video conference meeting system of claim 13, wherein only the power supply of the video conference meeting device receives power, and the main processor and the plurality of peripheral components are power-off when the video conference meeting device in the standby state.

* * * * *